US011168866B1

(12) United States Patent
Yang et al.

(10) Patent No.: US 11,168,866 B1
(45) Date of Patent: Nov. 9, 2021

(54) RAYLEIGH SCATTER LIGHT

(71) Applicant: LONGHORN INTELLIGENT TECH CO., LTD, Shenzhen (CN)

(72) Inventors: Haitao Yang, Shenzhen (CN); Lin Yang, Shenzhen (CN); Shaoqin Du, Shenzhen (CN); Xingwei Huang, Shenzhen (CN)

( * ) Notice: Subject to any disclaimer, the term of this patent is extended or adjusted under 35 U.S.C. 154(b) by 0 days.

(21) Appl. No.: 17/242,611

(22) Filed: Apr. 28, 2021

(51) Int. Cl.
| F21V 7/00 | (2006.01) |
| F21V 5/08 | (2006.01) |
| G02B 5/02 | (2006.01) |
| F21V 14/04 | (2006.01) |
| F21Y 115/10 | (2016.01) |
| F21V 9/02 | (2018.01) |

(52) U.S. Cl.
CPC ............. *F21V 7/0008* (2013.01); *F21V 5/08* (2013.01); *F21V 14/04* (2013.01); *G02B 5/0273* (2013.01); *F21V 9/02* (2013.01); *F21Y 2115/10* (2016.08)

(58) Field of Classification Search
None
See application file for complete search history.

(56) References Cited

U.S. PATENT DOCUMENTS

| 10,352,534 B2 | 7/2019 | Di Trapani | |
| 10,723,103 B2* | 7/2020 | Di Trapani | G02B 5/0242 |
| 10,982,839 B1* | 4/2021 | Yang | F21V 15/01 |
| 2017/0153021 A1* | 6/2017 | Di Trapani | A61N 5/0618 |
| 2018/0288844 A1* | 10/2018 | Fujii | F21V 9/02 |
| 2018/0320376 A1* | 11/2018 | Di Trapani | F21V 3/0625 |
| 2019/0178471 A1 | 6/2019 | Di Trapani | |
| 2020/0056754 A1* | 2/2020 | Di Trapani | F21S 11/007 |
| 2021/0108778 A1* | 4/2021 | Bonanomi | F21V 14/003 |

FOREIGN PATENT DOCUMENTS

| CN | 108700278 A | | 10/2018 |
| CN | 113237037 A | * | 4/2021 |

* cited by examiner

*Primary Examiner* — Britt D Hanley
(74) *Attorney, Agent, or Firm* — Clement Cheng

(57) ABSTRACT

A Rayleigh scatter light has a first layer and a second layer above the first layer. An LED emitter is mounted in the first layer. The LED emitter is configured to emit light. A focusing lens assembly is mounted in the first layer, and the focusing lens focuses light emitted from the LED emitter into a focused beam. A is mounted in the first layer. The near field mirror receives the focused beam and reflects a mirrored beam from the focused beam. A far field mirror is mounted in the second layer above the near field mirror. The far field mirror receives the mirrored beam from the near field mirror. The far field mirror reflects the mirrored beam to an angled beam. A Rayleigh scatter board is translucent and receives the angled beam which partially scatters when passing through the Rayleigh scatter board.

14 Claims, 1 Drawing Sheet

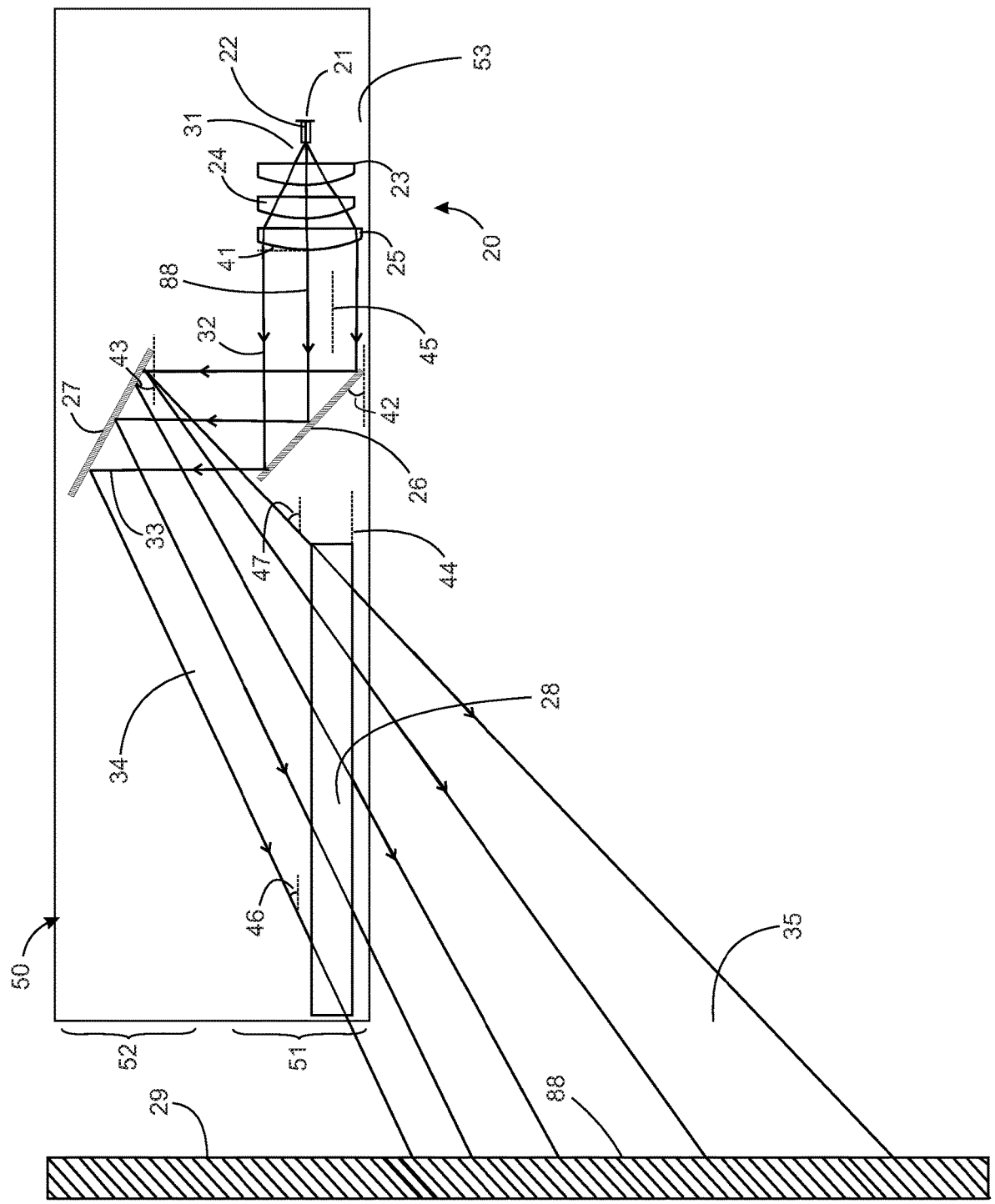

RAYLEIGH SCATTER LIGHT

FIELD OF THE INVENTION

The present invention is in the field of Rayleigh scatter lighting.

DISCUSSION OF RELATED ART

A variety of different Rayleigh scatter lighting devices have been described in patent literature.

A variety of different Rayleigh scatter lighting devices have been described in patent literature. For example, in U.S. Pat. No. 10,352,534 entitled Lighting system by inventor Paolo Di Trapani, published Jul. 16, 2019 the abstract discloses, "A lighting system comprises a light source for providing a light beam of directed non-diffused light with a first correlated color temperature along a main light beam direction; and a lamp shade-like structure comprising a bottom unit to be illuminated from the light source at one side and a screen structure provided at an opposite side, the bottom unit and the screen structure defining a light passage. The bottom unit comprises a diffused light generator for generating diffused light at a second correlated color temperature, which is larger than the first correlated color temperature, is at least partially transparent for the directed non-diffused light of the light beam, and is configured such that at least a divergent light beam portion of the light beam enters the light passage; and the screen structure is spatially oriented with respect to the main light beam direction of the divergent light beam portion."

For example, in U.S. Pat. No. 10,723,103 entitled Stratified panel structure for sun-sky-imitating lighting systems by inventor Paolo Di Trapani et al., published Jul. 28, 2020 the abstract discloses, "A chromatic stratified panel structure (100) for generating a sun-sky-imitating effect in lighting systems (1) comprises two cover panels (102, 104) at least one of which being a transparent panel; an adhesive transparent polymeric layer (106) sandwiched between the two inner faces of the two cover panels; and at least one nanoparticle-based Rayleigh-like diffusing coating (108) applied to an inner face of at least one of the two cover panels (102, 104) and/or to a face of the adhesive transparent polymeric layer (106) and forming an interlayer between one of the cover panels (102, 104) and the adhesive transparent polymeric layer (106)."

For example, in United States publication number 20170153021A1 entitled Illumination device simulating the natural illumination and including an infrared light source by inventor Paolo Di Trapani, published Jun. 1, 2017 the abstract discloses, "Illumination device for illuminating an environment (7), including a visible source (2), which emits a visible beam, and a diffuse light generator (2, 4; 68; 150), which includes an optical structure (4; 64; 150) delimited by an inlet surface (Si; S3), which receives the visible beam, and by an outlet surface (S2). The generator emits from the outlet surface diffuse visible light and direct visible light. The illumination device further includes an infrared optical source (15), which is different from the first visible source and emits an infrared beam so as to impinge on the inlet surface; the optical structure transmits at least one portion of the infrared beam. The illumination system further includes a ventilation system (40) which can be coupled to the environment, which introduces air masses into the environment, in pulsed mode."

For example, in United States publication number 20190178471A1 entitled Chromatic mirror, chromatic panel and applications thereof by inventor Paolo Di Trapani, published Jun. 13, 2019 the abstract discloses, "Chromatic components are presented which alleviate the usage in various applications in that this chromatic component is, according to a first aspect of the present application, made-up of a mirroring surface and a diffusing layer in front of the mirroring surface, which preferentially scatters short-wavelength components of impinging light with respect to long-wavelength components of the impinging light, and in that according to another aspect, the chromatic component is made up of a stratified-glass panel which comprises two less sheets sandwiching an adhesive transparent polymeric film wherein the adhesive transparent polymeric film forms a diffusing layer which preferentially scatters short-wavelength components of light passing the stratified-glass panel with respect to long-wavelength components of this light with respect to long-wavelength components of the same."

For example, in international patent number CN108700278A entitled The sun sky of perception window area with amplification simulates lighting system by inventor P. Di Trapani and D. Magati, published Oct. 23, 2018 the abstract discloses, "Room edge for especially forming room (12) Lighting system (1), the sky perception offer unit of amplification is provided (2), it includes form inward flange (14) Light penetrating panel (3) With with reflecting surface (13A) Mirror unit (13). Lighting system further includes light source (41), it is configured to pass through light penetrating panel (3) By direct beam (43) It is emitted to mirror unit (13) On so that the transmissive portion of light beam (9) By reflecting surface (13A) It is fully reflective, to generate the direct beam of the reflection especially for simulated solar light beam (17)."

SUMMARY OF THE INVENTION

A Rayleigh scatter light has a first layer and a second layer above the first layer. An LED emitter is mounted in the first layer. The LED emitter is configured to emit light. A focusing lens assembly is mounted in the first layer, and the focusing lens focuses light emitted from the LED emitter into a focused beam. A is mounted in the first layer. The near field mirror receives the focused beam and reflects a mirrored beam from the focused beam. A far field mirror is mounted in the second layer above the near field mirror. The far field mirror receives the mirrored beam from the near field mirror. The far field mirror reflects the mirrored beam to an angled beam. A Rayleigh scatter board is translucent and receives the angled beam which partially scatters when passing through the Rayleigh scatter board.

The Rayleigh scatter board is mounted in the first layer. The focusing lens assembly further includes a first focusing lens, a second focusing lens, and a third focusing lens. The Rayleigh scatter board has a Rayleigh scatter board orientation that is oriented parallel to the focused beam orientation. The Rayleigh scatter board is preferably horizontal. The mirrored beam is preferably vertically oriented. The near field mirror has a near field mirror angle that is adjusted for moving the bright spot to simulate movement of a sun. The far field mirror has a far field mirror angle that is adjusted for moving the bright spot to simulate movement of a sun. A homogenizing member receives light from the LED emitter and projects a bright spot onto a focusing lens assembly. A user sees the bright spot on the Rayleigh scatter board as a simulated sun.

BRIEF DESCRIPTION OF THE DRAWINGS

FIG. 1 is a cross section side view diagram showing the configuration of the present invention.

The following call out list of elements can be a useful guide in referencing the element numbers of the drawings.
20 focusing lens assembly
21 LED emitter
22 homogenizing rod
23 first focusing lens
24 second focusing lens
25 third focusing lens
26 near field mirror
27 far field mirror
28 Rayleigh scatter board
29 wall
31 initial LED output beam
32 focused beam
33 mirrored beam
34 angled beam
35 Rayleigh scattered light
41 focusing lens bevel angle
42 near field mirror angle
43 far field mirror angle
44 Rayleigh scatter board orientation angle
45 focused beam orientation
46 first angled beam angle
47 second angled beam angle
50 housing
51 first layer
52 second layer
53 top surface of the lower wall of the housing
88 bright spot

DETAILED DESCRIPTION OF THE PREFERRED EMBODIMENT

As seen in FIG. 1, the present invention shows a light fixture having a first layer 51 and a second layer 52. Components are arranged on the first layer. The first layer can be a top surface of the lower wall of the housing 53. The first layer 51 is aligned with the LED emitter 21 emitting light through a homogenizing member such as a homogenizing rod 22. The homogenizing rod 22 can be made as a glass prism, fiber-optic, or bundle of fiber-optic which diverts the light from the LED to a focusing lens assembly 20 that can be made as set of focusing lenses. The set of focusing lenses can include a first focusing lens 23, a second focusing lens 24, and a third focusing lens 25. The first focusing lens 23, the second focusing lens 24, and the third focusing lens 25 are collinear and horizontally oriented to form a horizontal beam which is a focused beam 32. Each of the lenses in the focusing lens assembly 20 may have a bevel with a focusing lens bevel angle 41. The focusing lens bevel angle 41 can be selected to provide a directed beam of light. The focused beam orientation 45 is horizontal and optionally has a bright portion toward the middle of the focused beam. The focused beam 32 then meets a near field mirror 26.

The near field mirror 26 has an upward angle which is the near field mirror angle 42. The near field mirror angle 42 can be forty five degrees from horizontal. The near field mirror angle 42 is an angle between the plane of the near field bearer 26 and the focused beam orientation 45. The near field mirror reflects the focused beam 32 upwardly to a far field mirror 27. Above the first layer 51 is a second layer 52. The far field mirror 27 is mounted to the second layer which is above the first layer. The mirrored beam 33 reflects from a far field mirror 27. The far field mirror 27 has an angle which is the far field mirror angle. The far field mirror 27 is above the near field mirror 26. The distance of the mirrored beam 33 can be adjusted depending upon the height of the housing 50. The present invention can be contained in a standard lighting troffer housing for low profile installations.

The far field mirror 27 is angled at a far field mirror angle 43 to reflect the mirrored beam 33 into an angled beam 34 which passes through a Rayleigh scatter board 28. The Rayleigh scatter board 28 can be a film, or glass having inclusions that scatter the light from the angled beam 34. The bright middle portion of the focused beam 32 becomes a bright middle portion of the mirrored beam 33, which becomes a bright portion of the angled beam 34. When the angled beam 34 passes through the Rayleigh scatter board 28, the Rayleigh scatter board produces a blue background which appears as a blue sky. The bright spot 88 appears as a brighter white middle portion that appears as a sun. The far field mirror 27 and the near field mirror 26 can have adjustable angles to mimic a sun moving across a sky or can be fixed angles. For example, the adjustable angles can be motor powered by servomotors. The housing 50 preferably has an inside surface that is reflective for directing scattered light through the Rayleigh scatter board 28.

The first layer 51 has first layer components that preferably include the Rayleigh scatter board 28, the near field mirror 26, the focusing lens that are mounted to a top surface of the lower wall of the housing 53. Optionally, a fixed angle, a first layer frame such as a stamped metal sheet frame can receive the first layer components. A metal frame can be stamped with openings such as slots that receive the first layer components in a drop in assembly process. The first layer frame and the second layer frame can be made as drawer trays that slide out from the lamp housing 54 easy and quick mounting of components.

A viewer from below can see the light reflecting from a wall 29. The wall provides indirect light to the occupants of the room when the wall diffuses the light into the room with Rayleigh scattered light 35 permeating the room. A cast shadow from the edge of the Rayleigh scatter board 28 provides a realistic skylight effect. An occupant looking upwards can see a simulated sun on a blue sky. The sun corresponds to the bright spot 88. The bright spot 88 can be se in size and focus.

The Rayleigh scatter board orientation angle 44 is preferably parallel to the focused beam orientation 45. The angled beam meets the Rayleigh scatter board 28 at a first angled beam angle 46 on a first side and a second angled beam angle 47 on a second side which may produce a gradient effect. The first angled beam angle 46 is less than the second angled beam angle 47. The wall 29 receives a projection of the blue sky light from the Rayleigh scatter board 28.

The invention claimed is:
1. A Rayleigh scatter light comprising:
 a. a first layer;
 b. an LED emitter, wherein the LED emitter is mounted in the first layer, wherein the LED emitter is configured to emit light;
 c. a focusing lens assembly, wherein the focusing lens assembly is mounted in the first layer, wherein the focusing lens focuses light emitted from the LED emitter into a focused beam;
 d. a near field mirror, wherein the near field mirror is mounted in the first layer, wherein the near field mirror receives the focused beam and reflects a mirrored beam from the focused beam;
 e. a second layer above the first layer;
 f. a far field mirror, wherein the far field mirror is mounted in the second layer above the near field mirror, wherein the far field mirror receives the mirrored beam from the near field mirror, wherein the far field mirror reflects the mirrored beam to an angled beam; and g. a Rayleigh scatter board, wherein the Rayleigh scatter board is translucent and configured to receive the angled beam, wherein the angled beam partially scatters when passing through the Rayleigh scatter board.

2. The Rayleigh scatter light of claim 1, wherein the Rayleigh scatter board is mounted in the first layer.

3. The Rayleigh scatter light of claim 1, wherein the focusing lens assembly further includes a first focusing lens, a second focusing lens, and a third focusing lens.

4. The Rayleigh scatter light of claim 1, wherein the Rayleigh scatter board has a Rayleigh scatter board orientation that is oriented parallel to the focused beam orientation, wherein the Rayleigh scatter board is horizontal.

5. The Rayleigh scatter light of claim 1, wherein the mirrored beam is vertically oriented.

6. The Rayleigh scatter light of claim 1, wherein the near field mirror has a near field mirror angle that is adjusted for moving the bright spot to simulate movement of a sun.

7. The Rayleigh scatter light of claim 1, wherein the far field mirror has a far field mirror angle that is adjusted for moving the bright spot to simulate movement of a sun.

8. The Rayleigh scatter light of claim 1, further including a homogenizing member receiving light from the LED emitter, wherein the homogenizing member projects a bright spot onto a focusing lens assembly, wherein a user sees the bright spot on the Rayleigh scatter board as a simulated sun.

9. The Rayleigh scatter light of claim 8, wherein the Rayleigh scatter board is mounted in the first layer.

10. The Rayleigh scatter light of claim 8, wherein the focusing lens assembly further includes a first focusing lens, a second focusing lens, and a third focusing lens.

11. The Rayleigh scatter light of claim 8, wherein the Rayleigh scatter board has a Rayleigh scatter board orientation that is oriented parallel to the focused beam orientation, wherein the Rayleigh scatter board is horizontal.

12. The Rayleigh scatter light of claim 8, wherein the mirrored beam is vertically oriented.

13. The Rayleigh scatter light of claim 8, wherein the near field mirror has a near field mirror angle that is adjusted for moving the bright spot to simulate movement of a sun.

14. The Rayleigh scatter light of claim 8, wherein the far field mirror has a far field mirror angle that is adjusted for moving the bright spot to simulate movement of a sun.

\* \* \* \* \*